Patented Feb. 13, 1951

2,541,068

UNITED STATES PATENT OFFICE 2,541,068

IRON OXIDE MANUFACTURE

Robert C. Johnson, Akron, and Samuel B. Bauman, Copley, Ohio, assignors to Minnesota Mining & Manufacturing Company, St. Paul, Minn., a corporation of Delaware No Drawing. Application April 10, 1948, Serial No. 20,357

4 Claims. (Cl. 23—200)

The present invention concerns the art of pigment manufacture and has special application in the making of iron oxide pigments.

This application is based upon and is a continuation in part of our copending application Serial No. 479,370, filed March 16, 1943, now abandoned.

Prior processes for making iron oxide pigments, e. g. red iron oxide pigments, have had various defects and, despite modifications from time to time, have left much to be desired, both from the point of view of the efficiency and workability of the process and also from the point of view of character and/or quality of the finished products.

Iron oxide pigments have heretofore commonly been made by roasting iron sulfate or iron sulfate-containing materials in a direct fired rotary kiln.

For many years pigment iron oxide has been manufactured by roasting copperas, i. e. hydrated ferrous sulfate, $FeSO_4.7H_2O$, whereby the sulfur is driven off as $SO_2$ and/or $SO_3$ leaving behind the iron oxide. Actually this calcination is commonly a 2-step process. If ordinary crystal copperas is fed directly to the kiln in which the roasting is being done, it is inclined to melt and stick to the walls of the kiln before all of the water is driven off, thus leading to the phenomenon commonly known as "ringing." Thick layers or rings of the ferrous sulfate build up on the walls of the kiln, become very hard as the moisture is driven off and seriously interfere with the process. For this reason the copperas is commonly fed first to a kiln which is operated at a temperature too low to decompose the iron sulfate wherein it gradually loses its moisture and gathers into small lumps or nodules which vary in size from less than ¼" in diameter to more than 1". This anhydrous iron sulfate, commonly known as "mother," is then fed to another kiln operated at a higher temperature wherein it is decomposed to iron oxide and oxides of sulfur. Various attempts have been made to accomplish these operations in a single step, as for example, the process described in Peter Fireman's patent, U. S. No. 2,184,738. Even this, however, is chiefly a mechanical linking of the two steps that are used in the conventional process since it consists essentially of the operation of two kilns in series which are fired separately, the first feeding directly to the second.

Another difficulty with the conventional process is that the iron sulfate during its dehydration does not become uniform in size but covers a considerable size range as indicated above and as will be discussed more fully hereinafter. This lack of uniformity makes it difficult (or impossible) to control the final calcining operation in such a manner that all of the iron sulfate is decomposed without a portion of the iron oxide being over-burned. Ordinarily no attempt has been made in such processes to secure complete decomposition of the iron sulfate, and since even a small portion of iron sulfate would render the pigment valueless for commercial applications, it has been necessary and customary to wash it in water, and then to filter and dry the undissolved iron oxide.

Such procedures are expensive and of limited effectiveness.

Suggestions have also been made to manufacture iron oxide pigments from the product obtained by treating iron ore with sulfuric acid and roasting the product. For example, Ledoux, U. S. Patent No. 360,967, suggests a method for preparing iron oxide pigments by treating pyrites sinter, the by-product obtained when iron pyrites is roasted to obtain sulfur dioxide, with sulfuric acid and roasting the mixture of iron sulfate and gangue which is obtained thereby. To our knowledge Ledoux's suggestions were never commercialized prior to the present invention. This was due, we believe, among other things, to the fact that after the pyrites sinter is so treated with sulfuric acid and allowed to cool and harden, it is necessary to crush it before it is fed to the kiln. This operation yields a material which is very non-uniform in size and behaves very poorly in the roasting operation.

When we attempted to commercialize a process of this sort, we found it necessary to treat the hard rock-like masses which result from the acid treatment of the ore in a hammer mill or crushing device. This resulted in a material which varied in size from more than an inch in diameter to a fine powder. When this was roasted, it was necessary that all of the iron sulfate be decomposed since the economics of the process did not allow for the washing and filtering of the roasted material. This meant that the roasting had to be carried on for a sufficient length of time and at a sufficiently high temperature completely to decompose all the iron sulfate even in the center of the larger pieces. This resulted in the over-burning of the smaller pieces so that the product was seriously lacking in uniformity of color. Other difficulties also arose with a material of this sort as a kiln feed. Very fine material would, to substantial extent, be blown from the kiln and thus lost as dust. In some cases the fine material tended to segregate to the bottom of the charge as it progressed through the kiln (e. g. a direct fired rotary kiln) so that it became more difficult completely to decompose than the intermediate sized pieces since, remaining always at the bottom of the charge, it did not have free access to the heat from the flame. By controlling the crushing or grinding of the impure sulfate of iron so as to produce a minimum of fines and later segregating the lumps that were too large, it was sometimes possible by using a low rate of feed to the kiln to avoid serious overburning of a portion of the iron oxide and to secure substantially complete decomposition of the iron sulfate, but the uniformity of the product obtained still left a great deal to be desired and the crushing operations were so expensive and the rates through the kiln were so low that the process was in no sense satisfactory commercially.

While correctly fired iron sulfate is of desired red color, overfiring of some of the kiln products makes them weak and bluish in color and, on the other hand, underfiring of other portions of the kiln product (where this occurs) leaves them on the yellow acid side. The substantially complete avoidance of underfired material according to prior methods was virtually certain to result in an increase in the proportion of overfired material in the product, as well as an increase in kiln costs and a decrease in quality which could not be remedied by washing.

A salient aspect of our invention provides for forming into extruded particles, short cylinders or pellets the material which is to be charged to the kiln or furnace, the extended pellets, or equivalent, being normally controlled within a predetermined diameter or size range.

It is an object of our invention to provide a process of producing pigments by calcination or firing which avoids or greatly minimizes overfiring as well as underfiring. A further object is to provide for stronger color development than with kiln feeds heretofore employed. A still further object is to greatly increase the kiln or furnace capacity, especially due to the better and more uniform heat conductivity of the particles or pellets of material charged into the kiln and the more uniform flow of such material resulting in better heat distribution. Another object is to minimize or obviate stack losses, due to absence of fines from the charge. A further object is to overcome the sticking, building up, or "ringing" so prevalent in the feed end, or cool end of the kiln in prior processes. These and other objects and advantages will be evident from the description taken as a whole.

We have found that the product obtained by treating ore with sulfuric acid can be extruded provided certain conditions are rigidly adhered to. If, after the iron ore is reacted with the sulfuric acid and before it has become cool, for example at a temperature of the order of 200° F., more or less, it is treated in a pug mill or similar device, it yields a plastic mass which is amenable to the extrusion operation. After leaving the pug mill the plastic mass (still at elevated temperature) enters the extruder, which may be of conventional design, having two screws which force the iron sulfate containing mixture against the die plate, which may be of the multiple orifice type, and extrude it at a temperature of the order above mentioned onto a conveyor belt. After cooling and drying somewhat, these extrusions are fed directly to the kiln.

By extruding the acid treated ore in this way we have found that, in the firing or calcining operation, the rate through the kiln can be fully double that realized with a feed prepared in any other manner, and the quality of the finished pigment is much better since over-burning is substantially avoided or eliminated and undecomposed iron sulfate is completely or substantially eliminated.

It will be recognized that the term "iron ore" as used herein covers naturally occurring ores such as hematite, and also covers iron-bearing materials such as pyrites sinter, which react with sulfuric acid to form iron sulfate.

The diameter of the extrusions thus prepared is not extremely critical, but we have preferred extrusions approximately ½" in diameter. Extrusions substantially smaller than this are more difficult to prepare because of the extremely high pressures developed on the die plate and are likely to be more friable before and during the calcination step. Extrusions substantially greater in diameter are difficult to roast uniformly to the center and result in low rates through the kiln. The optimum size will obviously vary somewhat with the exact nature of the material to be fired and the conditions of firing. However, in general, the diameter or small dimension of the pellets or extruded pieces of charge will normally fall within, or approximate, the range of ¼ to ¾ inch and usually will fall within a narrower range, say, ⅜ to ⅝ inch.

It has been found also that a plastic mass composed largely of iron sulfate, and which may be extruded to form small shaped pieces or extrusions suitable for our calcination process, may be prepared by warming and partially dehydrating copperas. The mass is then mixed in the pug mill prior to extrusion.

To obtain extended iron oxide pigments with copperas as the source of iron we may also add an extender to the copperas before it goes to the pug mill or other plasticizing equipment and thence to the extruder. For example, the following mixture may be used:

| | Parts |
|---|---|
| Copperas | 1850 |
| Ammonium sulfate | 97 |
| Lime | 16 |
| Salt | 5 |
| Clay | 500 |
| Water | 200 |

First the copperas is heated and melted with one-half of the water and then the remaining dry ingredients are incorporated in a mechanical mixer. The lime may be added as a suspension in one-half of the water. The mass is then mixed and cooled until it becomes plastic and is fed to the extruder. Other formulations and other additives may be employed with copperas or with other sources of iron sulfate, so long as a plastic mass is formed on mixing the warmed composition in the pug mill.

Hereinabove we have discussed advantages gained by having the material which is charged to the kiln, furnace or the like, of a reasonable uniform, predetermined size, especially as regards the cross-sectional dimensions of oblong pieces. Shape is also of importance in respect to heat transfer in the kiln and mechanical strength of the particles or pellets, but the shapes may vary quite widely. Where the pieces or extended pellets of charge are formed by extrusion they will usually be of circular, square, rectangular or triangular cross-section, with the length of the same of less importance and ordinarily varying considerably. However the length usually is greater than the diameter or cross-sectional dimension and, where the pieces are circular in cross-section and have a diameter of about ½ inch, they are commonly 1 to 3 inches in length, though the length can vary outside these limits. The smallest dimension of the particles or pellets is advantageously as nearly uniform as possible. While extrusion is one practical way of forming the material into sized particles, other ways of forming sized particles are also contemplated and are illustrated by procedures and practices well known in the arts of making pills, candy, etc.

While this invention has been illustrated largely in connection with the preparation of red iron oxide pigment, it is also applicable in the production of other pigments, especially to those where heating and agitation are involved in their production, including titanium oxide, lithopone, zinc sulfide, calcium sulfate, etc. However, the problems of over-heating and under-heating are more acute in the case of making red iron oxide and other pigments where a substantial endothermic reaction occurs during the firing; but the problems are nonetheless present in the making of various other pigments such as those illustrated above.

While our invention has been illustrated hereinabove in connection with specific materials, to produce particular pigments, it will be understood that it is applicable in the treatment of other materials in the preparation of similar or different pigments or end products. In other respects also the specific descriptions given herein are exemplary and not limitative, and all equivalents and variations, novel over the prior art, are likewise hereby comprehended.

What we claim is:

1. In the art of iron oxide pigment manufacture, the process which comprises selecting as a starting material a mass which is composed preponderantly of iron sulfate and which, upon mixing, is a solid plastic mass at elevated temperatures of the order of 200° F., mixing said mass at an elevated temperature to make it uniformly plastic, forming the plastic mass into small, shaped pieces having rounded surfaces and a substantially uniform small dimension of approximately ¼ to ¾ inches, allowing the pieces to dry sufficiently to harden and then calcining the shaped pieces under conditions (a) wherein all peripheral surfaces of the shaped pieces are exposed to a substantially uniform heat treatment and (b) wherein the temperature and time of treatment are controlled so as to decompose the iron sulfate.

2. In the art of pigment manufacture the process which comprises treating iron ore with sulfuric acid so as to convert the same largely to iron sulfate at an elevated temperature in excess of 200° F., mixing the resulting iron sulfate containing product at an elevated temperature to render the same plastic, extruding the plastic product to form extrusions thereof having a diameter of the order of ½ inch and a length of the order of 1 to 3 inches, allowing said extrusions to cool and dry sufficiently to harden, and then charging said extrusions continuously to a rotary kiln wherein the temperature and time of treatment is controlled so as to decompose said sulfate.

3. In the art of pigment manufacture the process which comprises treating iron ore with sulfuric acid at an elevated temperature so as to convert the ore largely to iron sulfate, mixing the resulting product at an elevated temperature to render it plastic, forming the plastic product into small shaped pieces having a substantially uniform small dimension, allowing the pieces to cool and dry sufficiently to harden and then charging them continuously to a rotary kiln wherein the temperature and time of treatment are controlled so as to decompose the iron sulfate.

4. In the art of iron oxide pigment manufacture a process which comprises selecting as a starting material a product which, upon mixing, is a solid, plastic mass at elevated temperatures of the order of 200° F. and which is composed preponderantly of iron sulfate, mixing such product at an elevated temperature to make it uniformly plastic, forming the plastic product into small shaped pieces having rounded surfaces and a substantially uniform small dimension, allowing the pieces to cool and dry sufficiently to harden and then charging them continuously to a rotary kiln wherein the temperature and time of treatment are controlled so as to decompose the iron sulfate.

ROBERT C. JOHNSON.
SAMUEL B. BAUMAN.

REFERENCES CITED

The following references are of record in the file of this patent:

UNITED STATES PATENTS

| Number | Name | Date |
|---|---|---|
| 20,655 | Monnier | June 22, 1858 |
| 360,967 | Ledoux | Apr. 12, 1887 |
| 513,679 | Hemingway | Jan. 30, 1894 |
| 1,894,368 | Crowley | Jan. 17, 1933 |
| 1,943,948 | Castner | Jan. 16, 1934 |

FOREIGN PATENTS

| Number | Country | Date |
|---|---|---|
| 404,991 | Great Britain | Jan. 23, 1934 |